US007035317B2

(12) United States Patent
Elezabi et al.

(10) Patent No.: US 7,035,317 B2
(45) Date of Patent: Apr. 25, 2006

(54) SINGLE-USER DECODER METRICS FOR SUBTRACTIVE INTERFERENCE CANCELLATION DETECTORS IN CODE-DIVISION MULTIPLE-ACCESS (CDMA) COMMUNICATION SYSTEMS WITH TIME DEPENDENCE VARIANCE RESIDUAL MULTIPLE-ACCESS INTERFERENCE (RMAI)

(75) Inventors: Ayman Elezabi, Raleigh, NC (US); Alexandra Duel-Hallen, Cary, NC (US)

(73) Assignee: North Carolina State University, Raleigh, NC (US)

( * ) Notice: Subject to any disclaimer, the term of this patent is extended or adjusted under 35 U.S.C. 154(b) by 741 days.

(21) Appl. No.: 09/957,339

(22) Filed: Sep. 20, 2001

(65) Prior Publication Data
US 2002/0122392 A1 Sep. 5, 2002

Related U.S. Application Data

(60) Provisional application No. 60/234,251, filed on Sep. 21, 2000.

(51) Int. Cl.
*H04B 1/69* (2006.01)
*H04B 1/707* (2006.01)
*H04B 1/713* (2006.01)
(52) U.S. Cl. ...................... 375/148; 375/130; 375/136; 375/144; 375/147; 375/148; 375/150; 370/441; 370/434; 370/320; 370/335; 370/342
(58) Field of Classification Search ................ 375/130, 375/136, 144, 147, 148, 150; 370/441, 434, 370/320, 335, 342; 455/463
See application file for complete search history.

(56) References Cited

U.S. PATENT DOCUMENTS 5,553,062 A * 9/1996 Schilling et al. ............ 370/479
5,644,592 A * 7/1997 Divsalar et al. ............ 375/147
6,161,209 A * 12/2000 Moher ........................ 714/780

OTHER PUBLICATIONS

"Two-stage receiver structures for coded CDMA systems" Vehicular Technology Conference, 1999 IEEE 49th, vol.: 2, May 16-20, 1999 pp.: 1425-1429 vol. 2.*
Elezabi et al., "Two-Stage Receiver Structures for Coded CDMA Systems," IEEE Vehicular Technology Conference, p. 1425-1429, (1999).
Elezabi et al., "Post-Decoding Interference Cancelation for Coded CDMA Systems," Proceedings of IEEE International Conference on Information Theory, p. 282, (1998).

(Continued)

*Primary Examiner*—Kevin Burd
*Assistant Examiner*—Juan Alberto Torres
(74) *Attorney, Agent, or Firm*—Jenkins, Wilson & Taylor, P.A.

(57) ABSTRACT

Improved branch metrics for Viterbi decoders in CDMA systems take into account the time dependency of the variance of the multiple access interference in any user's signal after the single-user detector, and the time dependency of the residual multiple access interference in any user's signal after subtractive interference cancellation is applied in two-stage detectors. The (residual) multiple access interference can be modeled as a Gaussian random variable with time dependent variance. Modeling the RMAI in such a way reduces the bit error rate in CDMA systems.

36 Claims, 7 Drawing Sheets

OTHER PUBLICATIONS

Zeng et al., "Modified Viterbi Detection for Recording Channels with Jitter," Proceedings of IEEE International Communications Conference, p. 305.5.1-305.5.5, (1992).

Varanasi et al., "Multistage Detection in Asynchronous Code-Division Multiple-Access Communications," IEEE Transactions on Communications, p. 509-519, (1990).

Pursley, "Performance Evaluation for Phase-Coded Spread-Spectrum Multiple-Access Communication-Part I: System Analysis", IEEE Transactions on Communications, p. 795-799, (Aug., 1977).

Serfling, "Contributions to Central Limit Theory for Dependent Variables," The Annals of Mathematical Statistics, vol. 39 (No. 4), p. 1158-1175, (1968).

* cited by examiner

SINGLE-USER DECODER METRICS FOR SUBTRACTIVE INTERFERENCE CANCELLATION DETECTORS IN CODE-DIVISION MULTIPLE-ACCESS (CDMA) COMMUNICATION SYSTEMS WITH TIME DEPENDENCE VARIANCE RESIDUAL MULTIPLE-ACCESS INTERFERENCE (RMAI)

RELATED APPLICATION

This application claims the benefit of U.S. provisional patent application No. 60/234,251, filed Sep. 21, 2000, the disclosure of which is incorporated herein by reference in its entirety.

GRANT STATEMENT

This work was supported by National Science Foundation (NSF) Grant CCR 9725271. Thus, the U.S. Government has certain rights in the invention.

TECHNICAL FIELD

The present invention relates to decoders for use in multiple-access communication systems. More particularly, the present invention relates to improved Viterbi decoder branch metrics for subtractive interference cancellation detectors in CDMA systems.

RELATED ART

Virtually all multiple-access communication systems today employ some form of forward error correction. A multiple-access communication system is a system in which multiple users can simultaneously communicate over the same channel. A CDMA system is a multiuser system in which signals of different users are spread over a wide frequency band using different spreading codes. The despreader in such a system uses the spreading code of each individual user to despread that user's signal and obtain the originally transmitted data. A decoder, such as a Viterbi decoder, may be used to correct bit errors in the received signal for each user in systems which employ convolutional encoders at the transmitter.

In addition to forward error correction, CDMA systems may employ multiuser detection to improve performance beyond that possible with single-user, also called conventional, detectors. A single user detector typically makes bit decisions for a single user based only on the spreading code and channel coefficients for that user. A multiuser detector uses the spreading codes and channel coefficients for other users to improve the bit decision for the user of interest. However, the maximum likelihood (ML) joint multiuser detector and decoder is prohibitively complex, and reduced-state, i.e., suboptimal, implementations are still impractical. Yet, a complete partitioning of the multiuser detection and decoding functionality in the receiver limits performance considerably. A practical solution to the problem, therefore, is to pass information between the multiuser detector and a bank of single-user decoders.

The term "single-user decoder" is not to be confused with the despreader that despreads the signal for each user using a spreading code or signature sequence for each user. In this context, "single-user decoder" refers to a decoder that makes bit decisions for an individual user's signal after a single-user or multiuser detector. Subtractive interference cancellation (IC) receivers, also referred to as multistage detectors, are a class of multiuser detectors that naturally have the potential for utilizing the single-user decoders to improve the IC itself. In addition, subtractive IC detectors offer a multitude of trade-offs between performance, complexity, and detection delay.

Much of the research in the area of CDMA receivers in the past decade has focused on improving multiuser detectors at a reasonable complexity. A bank of single-user Viterbi decoders with the standard Euclidean branch metric are usually employed after the multiuser detector. Potential improvements in the single-user decoders have, therefore, been largely overlooked. The standard branch metrics for single-user Viterbi decoders assume that the interference is Gaussian. Multiple access interference (MAI) in a CDMA system is the interference between user signals caused by the non-orthogonality of the signature sequences or spreading codes of different users. Residual MAI is the MAI that is left over due to imperfect subtractive interference cancellation. However, structured multiple-access interference (MAI), or residual MAI (RMAI), in a multiuser system is quite different from additive white Gaussian noise (AWGN), for which the standard Viterbi decoder (VD) branch metric was derived. Furthermore, the information available to a multiuser detector about the signal parameters of interfering users may be used to improve the Viterbi decoder branch metric. This information has not been used in prior art CDMA detectors to improve the Viterbi decoder branch metric. Accordingly, there exists a long-felt need for improved Viterbi decoder branch metrics that take into account the statistical characteristics of RMAI.

SUMMARY OF THE INVENTION

According to one aspect, the present invention includes improved branch metrics for the single-user Viterbi decoders (VDs) following a two-stage subtractive IC detector with the conventional first stage for a CDMA system using long spreading sequences, such as IS-95. The invention is based on modeling the RMAI as Gaussian with time-dependent variance after conditioning on the time-varying user cross-correlations and then modifying the VD branch metrics appropriately to account for this characterization and thereby improve performance.

According to another aspect, the present invention includes a novel method for estimating the variance of the RMAI.

Embodiments of the present invention may be implemented in hardware, software, or a combination of hardware and software. Accordingly, embodiments of the present invention may comprise computer-executable instructions embodied in a computer readable medium for performing steps for demodulating a CDMA signal.

Accordingly, it is an object of the invention to provide improved Viterbi decoder branch metrics that account for the time-dependence of the variance of RMAI.

It is another object of the invention to provide methods for estimating the variance of RMAI.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings, of which.

DISCLOSURE OF THE INVENTION

CDMA System Model and Receiver Structures

In a CDMA system to which embodiments of the invention may be applied, K users may transmit synchronously using binary CDMA signaling over a flat Rayleigh fading frequency-nonselective channel. At the receiver, a bank of K matched filter correlators or despreaders despreads each user's signal. Sampling at the bit rate, the output of the correlator bank for a given sample point at baseband can be written as $$y_k(1) = c_k b_k + \sum_{j=1, j \neq k}^{K} r_{kj} c_j b_j + n_k \quad k = 1, \ldots, K \quad (1)$$

where $c_k = |c_k| e^{j\theta_k}$ are independent and identically distributed zero-mean complex Gaussian fading coefficients, $b_k \in \{-1, +1\}$ is the data bit of user k, $n_k$ is a zero-mean complex Gaussian additive noise term with variance $\sigma^2$, and $r_{kj}$ is the normalized crosscorrelation between users k and j. The covariance between the real or imaginary parts of $n_j$ and $n_k$ is equal to $r_{kj}\sigma^2$ whereas the real and imaginary parts of any term $n_j$ are uncorrelated. The interleaver size is considered to be sufficient to render the fading coefficients uncorrelated from one bit interval, or sample point, to another. For coherent reception, the single-user, or conventional, first stage decision about the bit of user k is given by $\hat{b}_k(1) = \text{sgn}[y'_k(1)]$ where $$y'_k(1) = \text{Re}[e^{-j\theta_k} y_k(1)] \quad (2)$$

$$= |c_k| b_k + \left| \sum_{j=1, j \neq k}^{K} r_{jk} \right| |c_j| \beta_{jk} b_j + n'_k$$

where $\beta_{jk} = \cos(\theta_j - \theta_k)$, and $\{n'_j\}$ have the same joint distribution as $\{\text{Re}(n_j)\}$ or $\{\text{Im}(n_j)\}$. The output of the second stage, i.e. after one stage of Interference Cancellation (IC), for user 1 (henceforth, the user of interest) is given by $$y'_1(2) = |c_1| b_1 + \sum_{j=2}^{K} 2r_{1j} |c_j| \beta_{j1} e_j + n'_1 \quad (3)$$

$$= |c_1| b_1 + \zeta + n'_1$$

where $$e_j = \frac{1}{2}(b_j - \hat{b}_j(1))$$

represents the error in the first stage decision of user j and $\zeta = \Sigma_j \zeta_j$ is the total residual MAI (RMAI), where $\zeta_j$ is the RMAI due to user j. For the uncoded system, the final decisions are given by $\hat{b}_k(2) = \text{sgn}[y'_k(2)]$.

Figure 1:
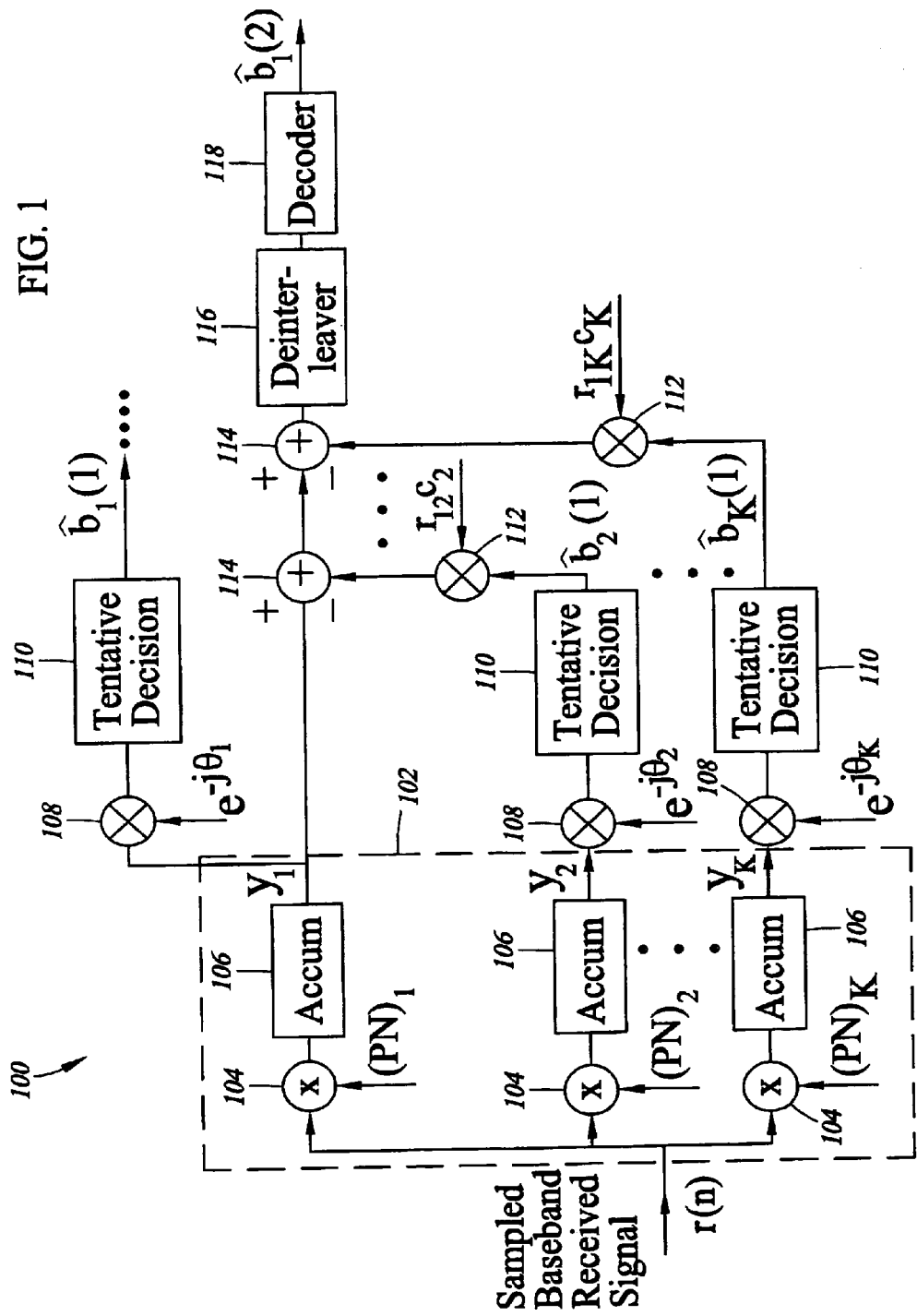
FIG. 1 is a block diagram of one branch of a CDMA demodulator including a Viterbi decoder having an improved branch metric according to an embodiment of the present invention.

Now, suppose each user's data is convolutionally encoded, where $b_j$ now refers to the code bit of user j during the interval of interest. The decoding may be performed either after, or before and after, the IC operation. According to a first embodiment of the invention, the IC is carried out entirely before performing any error correction. A conceptual diagram of this scheme is illustrated in FIG. 1. The system illustrated in FIG. 1 represents a complete partitioning of multiuser detection and decoding. This approach is referred to as Interference Cancellation with Undecoded, or Unreliable, Decisions (ICUD) due to the low reliability of the tentative decisions of the conventional first stage.

In FIG. 1, a single branch 100 of a CDMA demodulator for despreading and decoding the signal for one user in a multiuser system is shown. In FIG. 1, branch 100 receives a sampled baseband received signal r(n). The signal r(n) is input into a despreader 102. Despreader 102 includes multipliers 104 and accumulators 106 that despread the signal r(n) for each user. More particularly, each multiplier 104 multiplies the multiuser signal by the signature sequence of each user. Each accumulator 106 accumulates every N outputs of the multiplier as a real number $y_k$, where N is the number of chips per code bit and is called the spreading factor. After being processed by accumulators 106, the signals $y_k$ are input to phase correctors 108. Phase correctors 108 remove phase shifts caused by the fading channel and the asynchronous nature of the mobile users in a practical system. After being processed by phase correctors 108, the signals are processed by tentative decision blocks 110. Tentative decision blocks 110 first take the real part of each input signal. Next, the real part of each signal is applied to a zero threshold decision device. In the zero threshold decision device, a tentative bit decision is made for each bit. For example, if the real part of each signal is greater than zero, then the bit may be determined to be a logical one. If the real part of the signal is less than zero, then the bit may be determined to be a negative one.

The output of tentative decision block 110 for each user is then multiplied using multipliers 112 by the cross-correlation coefficients $r_{1j}$ and the complex fading coefficients $c_K$ and subtracted using subtractors 114 from the signal output from accumulator 106 for the user of interest (user 1). The signal output from the last subtractor 114 is then applied to deinterleaver 116, which is needed to put the bits back in order from the interleaving performed at the CDMA transmitter. Finally, the bits output from deinterleaver 116 are applied to Viterbi decoder 118. Viterbi decoder 118 includes an improved branch metric according to an embodiment of the present invention that estimates and takes into account the time dependency of the residual multiple access interference. This metric will be described in detail below. The output from Viterbi decoder 118 is a bit decision for user 1, the user of interest. It will be appreciated by those of ordinary skill in the art that the process described for FIG. 1 is repeated for the signal for each user.

Figure 2:
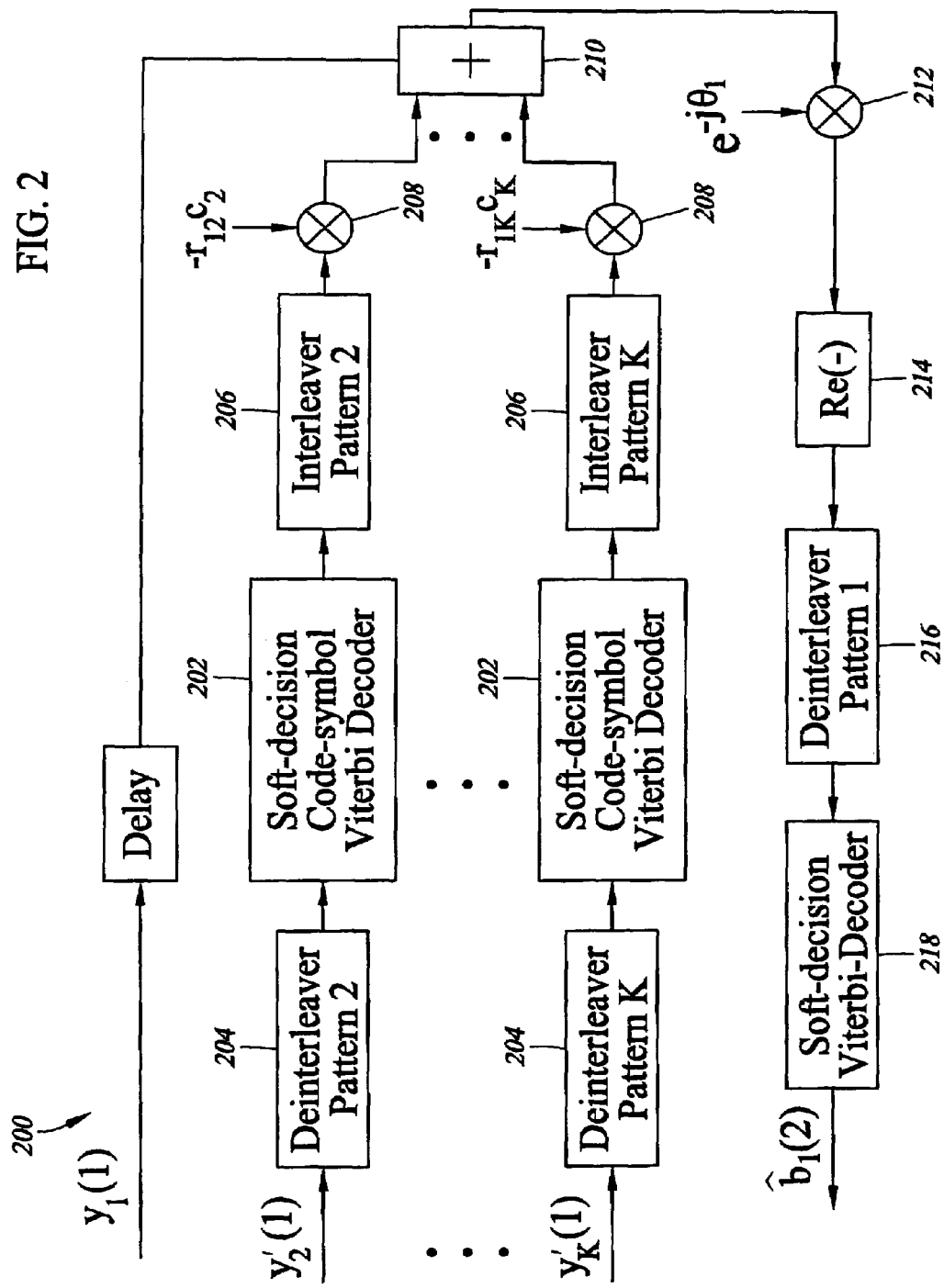
FIG. 2 is a block diagram of one branch (that of user 1) of a CDMA demodulator including first and second Viterbi decoders wherein the second Viterbi decoder includes an improved branch metric according to an embodiment of the present invention.

An alternative structure is the post-decoding IC (PDIC) receiver where a bank of single-user VDs prior to the second stage results in better tentative decisions on the code bits { $\hat{b}_j(1)$}. A second bank of VDs is of course needed after the IC operation and so the deinterleaving and decoding delay is doubled. A block diagram of this scheme is illustrated in FIG. 2. FIG. 2 illustrates a branch 200 for user 1 of a modified multiple-access demodulator according to an embodiment of the present invention. In FIG. 2, the signal $y_1$ is the same as the signal $y_1$ output from the accumulators 106 in FIG. 1. The signals $y'_k(1)$ indicate the real part of the signals after phase correction of the output from the accumulators of the other users. In FIG. 2, Viterbi decoders 202 make a preliminary bit decision before interference cancellation is applied to each signal. More particularly, the real part of the despread sampled baseband signal is deinterleaved by deinterleavers 204. Deinterleavers 204 undo the interleaving performed by the CDMA transmitter. Viterbi decoders 202 make a decision for the code bits based on a soft, i.e., continuous valued, input. The outputs from Viterbi decoders 202 are then input to interleavers 206. Interleavers 206 are required to appropriately reorder user bits for multiple access interference cancellation. Interleavers 206 are needed because the MAI subtraction must occur with bits in the same order that they interfered with each other at the transmitter. Multipliers 208 and adder 210 attempt to remove the multiple access interference from the signal for the user of interest.

Once the multiple access interference is removed, the signal for the user of interest is applied to phase corrector 212, which removes the phase shift from the signal caused by the fading channel. Block 214 takes the real part of the received signal. Deinterleaver 216 removes the interleaving produced by the interleaver at the transmitter. Finally, Viterbi decoder 218 applies an improved metric that estimates and takes into account the time dependency of the residual multiple access interference. The output from Viterbi decoder 218 is a bit decision with improved accuracy.

The PDIC scheme illustrated in FIG. 2 is superior to the ICUD in performance when distinct interleaving patterns (DIP) are assigned to the users. The DIP scheme is needed to randomize the error bursts coming out of the first VD bank, which are detrimental to the performance of the second VD bank.

From the above description, it is apparent that subtractive IC detectors generally require the channel estimates, cross-correlation values (or spreading sequences), and also timing estimates of all interfering users. The single-user Viterbi decoders may also benefit from such information, particularly since it is available or acquired at the IC stages. In the following section, improved VD branch metrics according to the present invention will now be described for both ICUD and PDIC receiver structures based on this idea.

Modified Viterbi Decoder Branch Metrics for
Subtractive Interference Cancellation Detectors The modified VD branch metrics according to the present invention are based on how the RMAI in the signal of the user of interest is modeled. Consider the RMAI terms $\zeta_j = 2r_{1j}|c_j|\beta_{j1}e_j$. For deterministic sequences, the sum of these terms plus the additive Gaussian noise was found to have a probability density function that can be reasonably approximated by the Gaussian density. This is supported by application of the Central Limit Theorem (CLT) for dependent variables, as well as the fact that the factor $|c_j|\beta_{j1}$ in $\zeta_j$ is Gaussian. For systems with long (random) sequences, on the other hand, the RMAI terms $\{\zeta_j\}$ involve additional randomness due to the time-varying crosscorrelations $\{r_{1j}\}$. The total RMAI is "less Gaussian" in this case, which is detrimental to the performance of the VD bank since the ML (maximum-likelihood) metric used in the VD is derived based on the assumption of Gaussian interference. Yet, $\zeta_j$ may be viewed as the product of the approximately Gaussian random variable $(|c_j|\beta_{j1}e_j)$ and $r_{1j}$. The crosscorrelations can be calculated at the receiver. Thus, conditioning on $\{r_{1j}\}$, the total RMAI $\zeta$ plus noise may be modeled as a Gaussian random variable with time-dependent variance. The ML metric for AWGN channels with time-dependent variance can be derived from basic principles. Referring to user 1, given the channel coefficients $\{|c_{1,i}|\}$ and crosscorrelations $\{r_{1j,i}\}$, where i denotes the i-th code bit interval, and due to the memory-less nature of the channel, the ML bit sequence is that which maximizes the conditional probability density function $$f(y'_{1,i}(2))\{|c_{1,i}|, b_{1,i}, r_{1j,i}\} = \prod_i \frac{1}{\sqrt{2\pi}\,\psi_{1,i}} e^{-[y'_{1,i}(2)-|c_{1,i}|b_{1,i}]^2/2\psi_{1,i}} \quad (4)$$

where $\psi_{1,i} = \text{Var}[\zeta + n'_1 | \{r_{1j,i}\}] \approx \text{Var}[\zeta | \{r_{1j,i}\}] + \sigma^2$ and $y'_{1,i}(2)$ is the soft output after IC with the added subscript i denoting time. Taking the logarithm, and dropping terms irrelevant to the maximization, the branch metric that is used in the VD to recursively maximize the above density becomes $$[y'_{1,i}(2) - |c_{1,i}|b_{1,i}]^2 / \psi_{1,i} \quad (5)$$

The task now becomes that of finding the conditional variance $\psi_{1,i}$.

Modified Viterbi Decoder Branch Metrics for
Single User Detectors

The modified Viterbi decoder branch metrics discussed above are not limited to use with subtractive interference cancellation detectors. For example, in an alternative embodiment of the invention, a single user detector in a multiple user system, such as a CDMA system, may be followed by a Viterbi decoder with a modified branch metric that takes into account the time-dependent variance of the MAI, rather than the RMAI discussed above for subtractive interference cancellation detectors. In such an embodiment, the modified branch metric may be:

$$[y'_{1,i} - |c_{1,i}|b_{1,i}]^2 / \eta^2_{1,i} \qquad (5a)$$

where i is a time index, $y'_{1,i}$ the input signal to the decoder for the user of interest, $|c_{1,i}|$ is the instantaneous amplitude of the signal, $b_{1,i}$ is a code bit, and $\eta^2_{1,i}$ is the time-dependent variance of the MAI plus noise. Methods for calculating the time-dependent variance of the MAI plus noise will be described in detail below with regard to equation (7). For the single user detector, the subscript j in equation (7) is replaced by a 1 to indicate the user of interest.

Improved VD Metrics For ICUD Structures

It can be shown that the conditional variance of the total RMAI plus noise for systems with long (random) spreading sequences may be approximated by $$\psi_{1,i} \approx 2 \sum_{j=2}^{K} r^2_{1j,i} \varepsilon_j \left[ 1 - \sqrt{\frac{\varepsilon_j}{\varepsilon_j + \eta^2_{j,i}}} \left( \frac{3\eta^2_{j,i} + 2\varepsilon_j}{2\eta^2_{j,i} + 2\varepsilon_j} \right) \right] + \sigma^2 \qquad (6)$$

where $$\eta^2_{j,i} = \eta^2_j = \frac{1}{N} \sum_{l \neq j} \varepsilon_l + \sigma^2 \qquad (7)$$

represents the unconditional variance of the MAI (i.e., at the first stage) plus noise seen by user $$j, \varepsilon = \frac{1}{2} E[|c_j|^2]$$

is the average code bit energy, and N is the spreading factor which is equal to the number of code bits per chip. The unconditional MAI plus noise variance seen by user j as given in (7) is an approximation to the variance conditioned on $r_{1j}$. In obtaining the above estimate of $\psi_{1,i}$, the dependence between only $|c_j|$ and $e_j$, among the factors of $\zeta_j$, has been taken into account since the dependence between the remaining factors was found to be weak. The modified branch metric based on using (7) in (6) is denoted by M1. Note that the right hand side of (7) does not depend on i, the time index. This is because the average of the square of the user crosscorrelations, $E[r^2_{jk}] = 1/N$, is utilized rather than the exact MAI plus noise variance conditioned on $\{r_{1j}\}$. This of course simplifies the metric computation. On the other hand, a more accurate estimate of $\psi_{1,i}$ can be obtained if we condition on $$\{r_{lj,i}: l, j = 1, \ldots, K \text{ and } l \neq j\},$$

i.e., on all the users' crosscorrelations rather than just the crosscorrelations between user 1 and the other users. In that case, the MAI plus noise variance $n^2_{j,i}$ conditioned on all crosscorrelations is exactly given by $$\eta^2_{j,i} = \sum_{l \neq j} \varepsilon_l r^2_{jl,i} + \sigma^2 \qquad (8)$$

Figure 3:
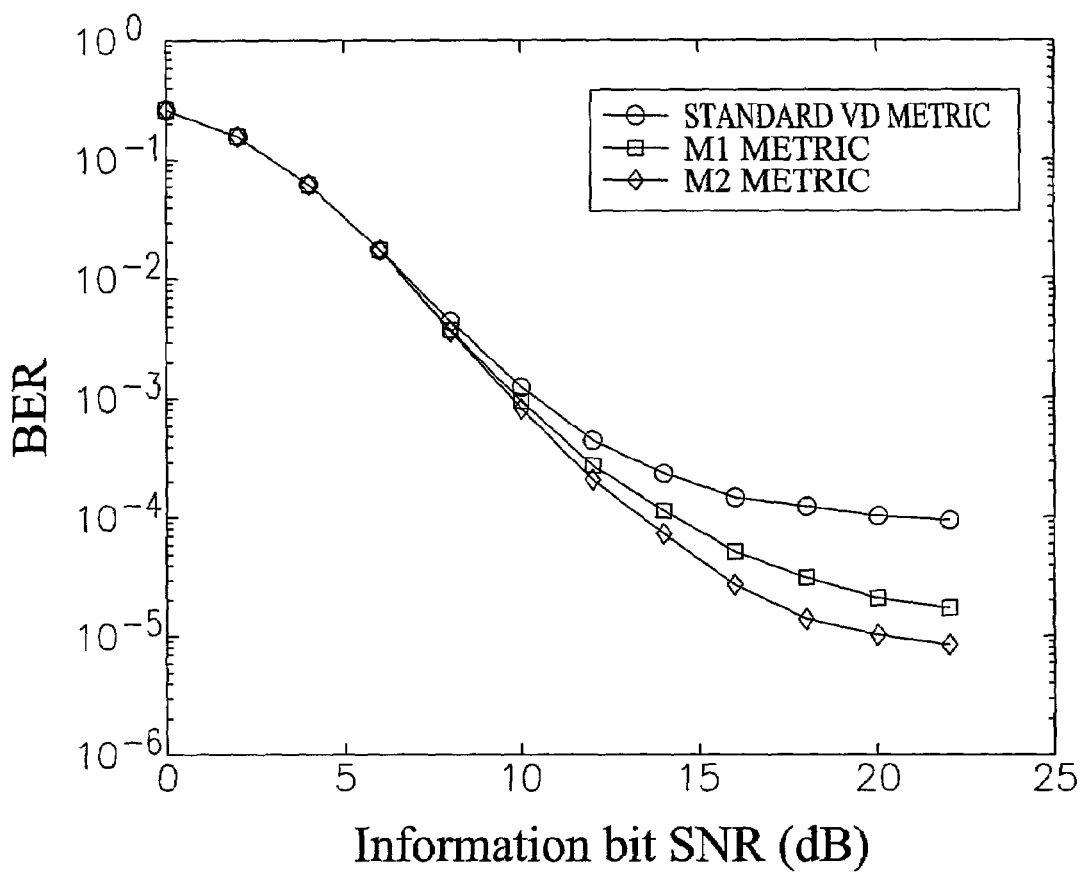
FIG. 3 is a graph of bit error rate versus SNR comparing the performance of standard Viterbi decoder metrics with the performance of a modified Viterbi decoder metric according to an embodiment of the present invention.
Figure 4:
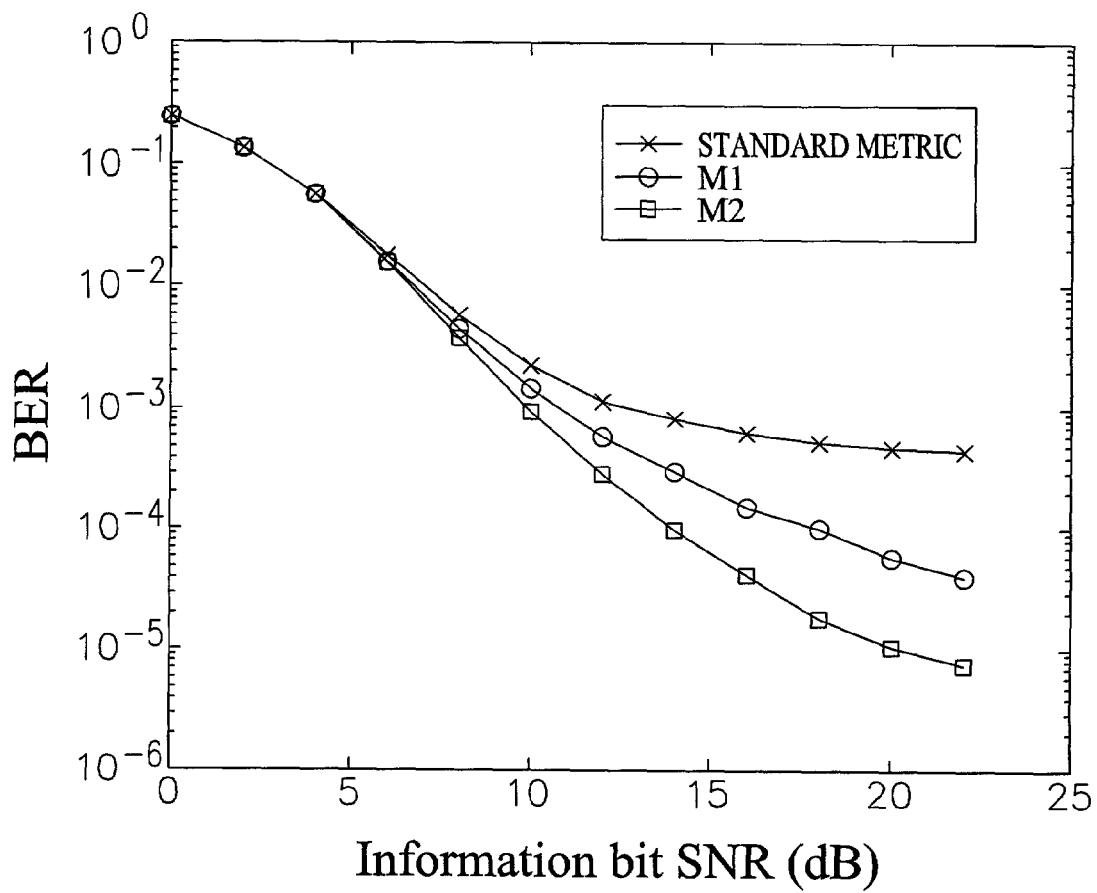
FIG. 4 is a graph of bit error rate versus SNR comparing the performance of standard Viterbi decoder metrics with the performance of a modified Viterbi decoder metric according to an embodiment of the present invention.

The metric based on using (8) in (6) is denoted by M2. FIG. 3 shows the performance improvement due to the modified soft-decision VD metrics for 8 users with N'=32 on a frequency nonselective Rayleigh fading channel. N'=2N for half-rate codes and is the number of information bits per chip. Performance comparisons are given in terms of N' since it is independent of the code rate used and represents the overall bandwidth spreading due to both the pseudo-noise (spreading) sequences and the encoding. Similarly, FIG. 4 compares the performance obtained using the standard Euclidean metric to the performance using M1 and M2 for a 4-user system with N'=16 on a frequency nonselective Rayleigh fading channel. From the aforementioned two figures, the BER improvement due to the modified metrics is between roughly one and two orders of magnitude.

It is worth mentioning that, at low SNR, the inaccuracy in the estimate of the variance in (6) limits the improvement of the modified metrics, which is not the case at high SNR. This can be easily explained for the case of equal user energies and the M1 metric. In that case, when $\sigma^2$ is negligible (i.e., at high SNR), $\psi_{1,i}$ consists of the product of a constant factor and time-varying factor $\Sigma_{j=2}^{K} r_{1j,i}^2$, which can be calculated exactly. Only the time-varying factor affects the path selection since any constant in the denominator of (5) will appear in both operands of the compare operation of the VD and is therefore irrelevant. Hence, any inaccuracy in the estimate of (6) has no effect on performance. At low SNR, on the other hand, where $\sigma^2$ cannot be neglected, decomposing $\psi_{1,i}$ into time-varying and constant factors is not possible and the exact estimate is needed.

This problem at low SNR can be mitigated by multiplying the RMAI variance term, i.e., the summation, in (6) by a scale factor, $\alpha$, that relates the true variance to the variance estimated from (6). In other words, $\alpha$ would partly compensate for the dependences ignored in estimating $\psi_{1,i}$. The factor $\alpha$ would probably be obtained empirically and may be a function of fixed system parameters such as N for fixed-rate systems, or parameters that change infrequently such as K, N for multi-rate systems, and the SNR.

Improved VD Metrics for PDIC Structures

The basic idea for modifying the VD branch metric is the same for PDIC structures. In estimating $\psi_{1,i}$, however, for PDIC structures, the dependence between $\psi_j$ and $|c_j|$ in the RMAI terms is ignored. This is because it is weaker than in the ICUD case and much more difficult to take into account since the first stage errors are due to error events from the first VD bank. The time-dependent variance may thus be approximated by $$\psi^2_{1j} \approx 4 \sum_{j=2}^{K} r^2_{1j,i} \varepsilon_j P_j + \sigma^2 \qquad (9)$$

where $P_j$ is the first stage code bit error probability. Strictly speaking, $P_j$ should be a function of the crosscorrelation values on which we condition. However, to simplify the metric the average value of the code BER for each user is used, which is upper-bounded using a union bound and the exact expression for the pairwise error probability. In practice, $P_j$ can be measured during call initialization.

Figure 5:
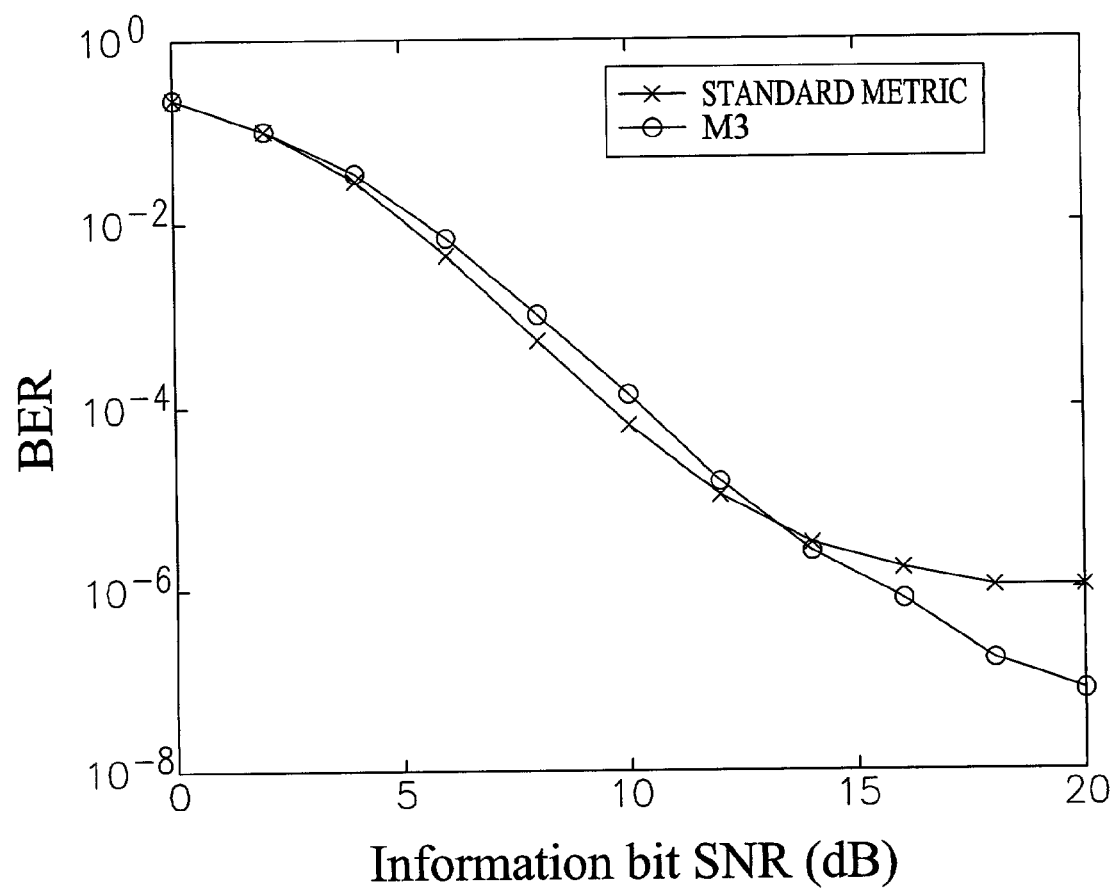
FIG. 5 is a graph of bit error rate versus SNR comparing the performance of standard Viterbi decoder metrics with the performance of a modified Viterbi decoder metric according to an embodiment of the present invention.

FIG. 5 shows the performance improvement due to the modified metric, which is denoted by M3, for a system with 6 users and N'=32. At high SNR, the BER is one order of magnitude lower when using the M3 metric. Similar to the ICUD case, performance at low to moderate SNR suffers from the inaccuracy of the estimate of $\psi_{1,i}$. Indeed, up to a certain SNR the performance using the M3 metric is even worse than the standard Euclidean branch metric. This is because of the crude estimate used in this case for the RMAI variance conditioned on the crosscorrelations in addition to the looseness of the union bound at low SNR which results in a poor estimate of $P_j$. Thus, performance in a practical system which could use measurements of $P_j$ should be better. Furthermore, and similar to the ICUD case, the performance gain may be increased at low SNR by more realistic estimates of the RMAI variance. Such better estimates can be obtained from (9) by inclusion of a scale factor multiplying the summation as described for the ICUD case.

DISCUSSIONS AND CONCLUSIONS

The present invention is useful for improving performance of subtractive IC receiver structures for CDMA systems with forward error correction. Single-user VDs are usually employed in multiuser receivers for their relatively low complexity. Despite various advances in multiuser detection, little or no attention has been given to improving the single-user VD branch metrics in multiuser receivers. For subtractive IC detectors information about the interfering users is available or acquired since it is needed in the IC stages. Some of this information may be incorporated in the VD branch metrics to improve performance. For CDMA systems with long sequences, such as IS-95, several modifications, of varying complexity and performance, have been proposed to the VD branch metrics. The modifications were based on modeling the RMAI as Gaussian conditioned on the time-varying user crosscorrelations and deriving an accurate estimate of the RMAI variance. Significant performance improvement was demonstrated at moderate to high SNR. It should be mentioned that the modified VDs require an estimate of the average SNR or, equivalently, the noise power except at high SNR where the noise variance $\sigma^2$ may be neglected in (6). This information is not explicitly needed for the IC stage, but is not difficult to calculate.

The performance gain may be further increased based on more accurate estimates of the conditional variance of the RMAI plus noise, particularly for the low SNR region. This improved accuracy may be obtained by inclusion of scale factors (to be obtained experimentally) in the derived expressions. The metrics were proposed for two alternative receiver structures: ICUD, in which IC occurs before any de-coding takes place, and PDIC where decoded decisions are used in IC. For the latter scheme, a further refinement is possible by calculating the first stage code bit error probabilities as a function of the time-varying crosscorrelations $\{r_{1g,i}\}$. This would parallel the metric M2 for the ICUD structure, and we would obtain a conditional (and time-varying) code bit error probability $P_{j,i}$. Since this error probability would have to be estimated in real-time, however, it appears that such an approach may be impractical at the moment.

The single-user VD branch metrics may be further improved, generally speaking, by incorporating additional knowledge about the interfering users' signal parameters. This may be very attractive particularly when this information is readily available or must be acquired for the IC stages of the receiver.

The improved single-user decoder branch metrics according to embodiments of the present invention may be incorporated at any point in a CDMA communication network where CDMA signals are received. For example, it may be desirable to incorporate such branch metrics in a base station in a CDMA system. Alternatively, the improved branch metrics may be incorporated in a mobile communication handset. Using the improved single-user decoder branch metrics at any receiving location in a CDMA system is intended to be within the scope of the invention.

Figure 6:
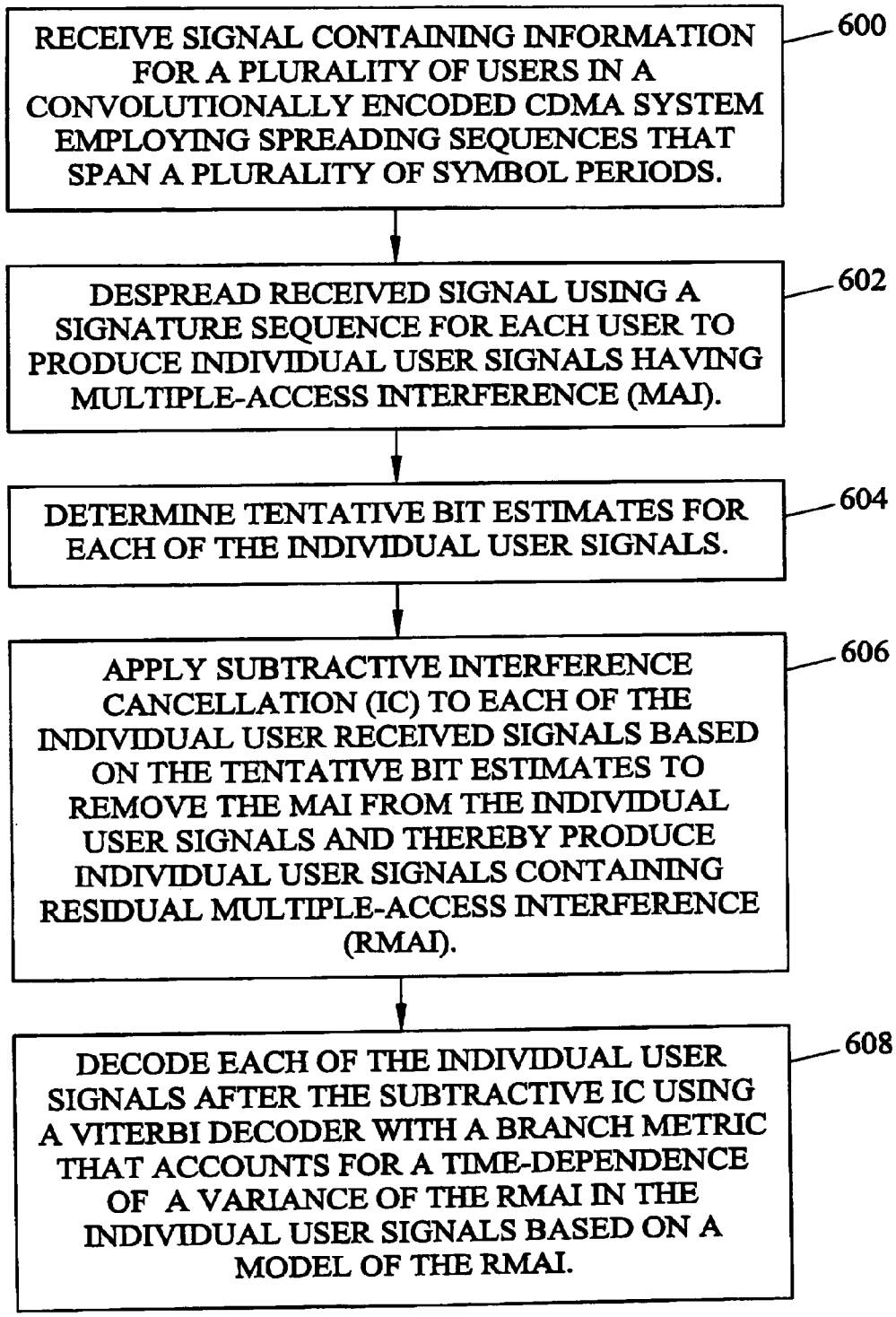
FIG. 6 is a flow chart illustrating an exemplary method for demodulating a multi-user signal using a subtractive interference cancellation (IC) detector and single user detectors for a convolutionally-encoded code-division multiple-access (CDMA) system according to an embodiment of the present invention.

According to one aspect, the present invention includes a method for demodulating a multi-user signal using a subtractive interference cancellation (IC) detector and single-user decoders for a convolutionally-encoded code-division multiple-access (CDMA) system. FIG. 6 illustrates an example of such a method. Referring to FIG. 6, in step 600, a signal containing information for a plurality of users in a convolutionally-encoded CDMA system employing spreading sequences that span a plurality of symbol periods is received. In step 602, the received signal is despread using a signature sequence for each user to produce individual user signals having multiple-access interference (MAI). In step 604, tentative bit estimates for each of the individual user signals are determined. In step 606, subtractive interference cancellation is applied to each of the individual user received signals based on the tentative bit estimates to remove the MAI from the individual user signals and thereby produce individual user signals containing residual multiple-access interference (RMAI). In step 608, each of the individual user signals are decoded after the subtractive interference cancellation using a Viterbi decoder with a branch metric that accounts for a time dependence of a variance of the RMAI in the individual user signals based on the model of the RMAI.

Figure 7:
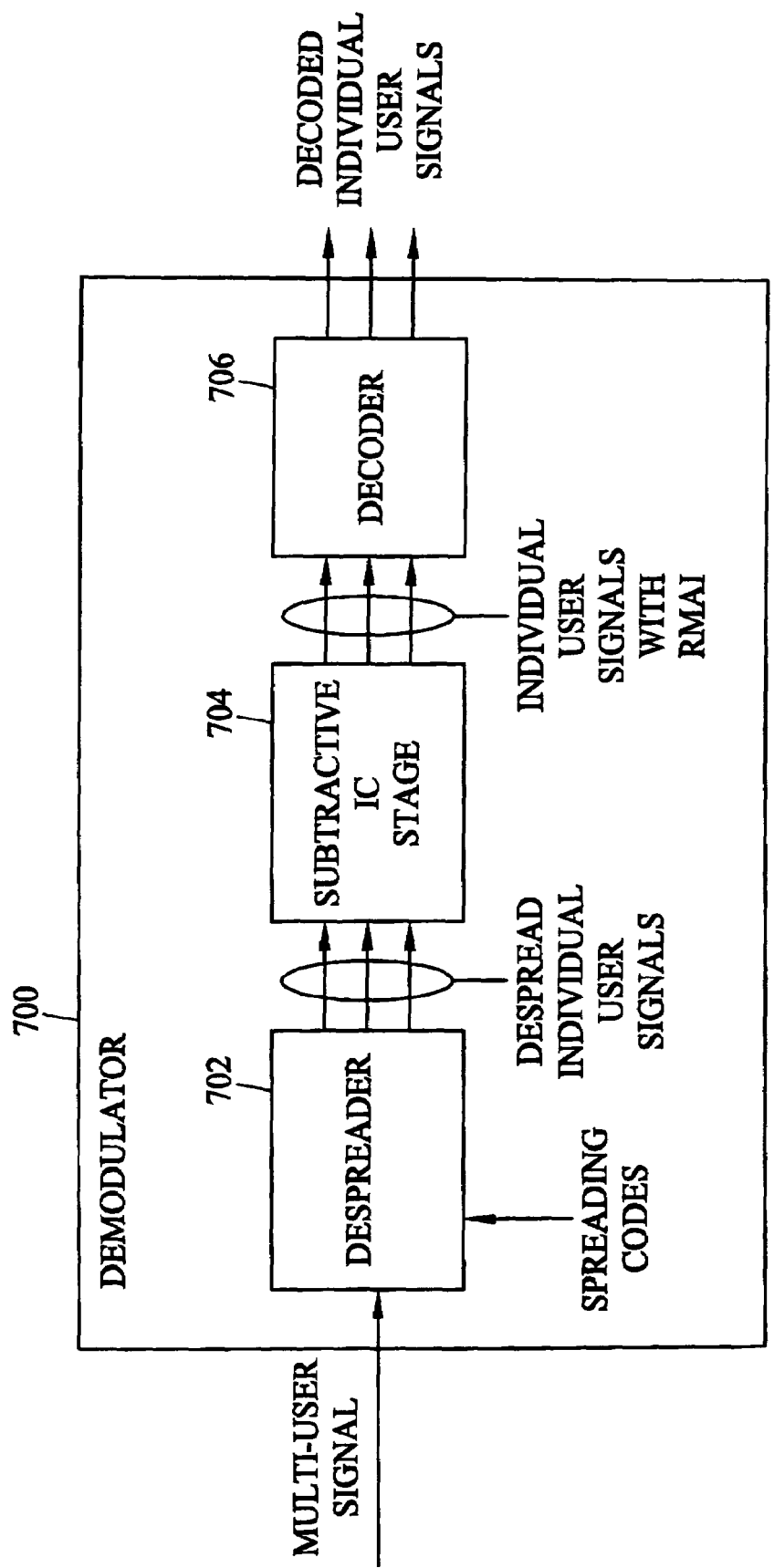
FIG. 7 is a block diagram illustrating a demodulator for demodulating a multiuser signal using subtractive interference cancellation (IC) and single user decoding for a code division multiple access (CDMA) system according to an embodiment of the present invention.

According to another aspect, the present invention includes a demodulator for demodulating a multi-user signal using subtractive interference cancellation (IC) and single-user decoding for a code-division multiple-access (CDMA) system. FIG. 7 illustrates such a demodulator. In FIG. 7, demodulator 700 includes a despreader 702 for receiving a signal containing information for a plurality of users in a convolutionally encoded CDMA system employing spreading sequences that span a plurality of symbol periods and for dispreading the received signal using a signature sequence for each user to produce individual user signals having multiple-access interference (MAI). Demodulator 700 also includes a subtractive interference cancellation (IC) stage 704 for determining tentative bit estimates for each of the individual user signals and applying subtractive interference cancellation to each of the individual user signals based on the tentative bit estimates to remove MAI from the individual user signals and thereby produce individual user signals containing residual multiple access interference (RMAI). The demodulator further includes a decoder 706 for decoding the individual user signals output from the subtractive IC stage using a branch metric that accounts for the time dependence of the variance of the RMAI and the individual user signals based on a model of the RMAI.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for demodulating a multiuser signal using a subtractive interference cancellation (IC) detector and single-user decoders for a convolutionally-encoded code-division multiple-access (CDMA) system, the method comprising:
   (a) receiving a signal containing information for a plurality of users in a convolutionally encoded CDMA system employing spreading sequences that span a plurality of symbol periods;
   (b) despreading the received signal using a signature sequence for each user to produce individual user signals having multiple-access interference (MAI);
   (c) determining tentative bit estimates for each of the individual user signals;
   (d) applying subtractive interference cancellation (IC) to each of the individual user received signals based on the tentative bit estimates to remove the MAI from the individual user signals and thereby producing individual user signals containing residual multiple-access interference (RMAI); and
   (e) decoding each of the individual user signals after the subtractive IC using a Viterbi decoder with a branch metric that accounts for a time-dependence of a variance of the RMAI in the individual user signals based on a model of the RMAI.

2. The method of claim 1 wherein decoding each of the individual user received signals using a Viterbi decoder with a branch metric that accounts for the time-dependence of the variance of the RMAI includes modeling the RMAI as a Gaussian random variable with time-dependent variance and computing the time-dependent variance of the RMAI.

3. The method of claim 1 wherein the Viterbi decoder branch metric comprises:

$$[y'_{1,i}(2) - |c_{1,i}| b_{1,i}]^2 / \psi_{1,i},$$

where $i$ is a time index, subscript 1 corresponds to a user of interest, $y'_{1,i}(2)$ is one of the individual user signals containing RMAI, $|c_{1,i}|$ is the instantaneous amplitude of the signal $y'_{1,i}(2)$, $b_{1,i}$ is a code bit, and $\psi_{1,i}$ is the time-dependent variance of the RMAI plus noise.

4. The method of claim 2 wherein computing the time-dependent variance of the RMAI comprises computing the time-dependent variance conditioned on time-varying cross-correlations between the signature sequences.

5. The method of claim 4 wherein computing the variance conditioned on the time-varying cross-correlations between the signature sequences comprises computing the variance according to the following equation:

$$\psi_{1,i} \approx 2 \sum_{j=2}^{K} r_{1j,i}^2 \varepsilon_j \left[ 1 - \sqrt{\frac{\varepsilon_j}{\varepsilon_j + \eta_{j,i}^2}} \left( \frac{3\eta_{j,i}^2 + 2\varepsilon_j}{2\eta_{j,i}^2 + 2\varepsilon_j} \right) \right] + \sigma^2,$$

where $\psi_{1,i}$ is the time-dependent variance of the RMAI, $r_{1j,i}$ is the cross correlation between the user of interest and user $j$ at time $i$, $\varepsilon_j$ is the average code bit energy, $\eta_{j,i}^2$ is the variance of the multiple access interference plus noise seen by user $j$ at time $i$ after first stage processing, and $\sigma^2$ is the time-independent variance of the channel noise.

6. The method of claim 2 wherein computing the time-dependent variance of the RMAI includes computing unconditional variance of the MAI present in the individual user signals.

7. The method of claim 6 wherein computing the unconditional variance of each of the individual user received signals comprises computing the unconditional variance according to the following equation:

$$\eta_{j,i}^2 = \eta_j^2 = \frac{1}{N} \sum_{l \neq j} \varepsilon_l + \sigma^2$$

where $\eta_{j,i}^2$ is the time-dependent variance of the MAI plus noise and is approximated by the unconditional variance $\eta_j^2$, $N$ is the spreading factor, $\varepsilon_l$ is the average code bit energy and $\sigma^2$ is the time-independent variance of the channel noise.

8. The method of claim 2 wherein computing the time-dependent variance of the RMAI includes computing the variance of the MAI present in the individual user signals conditioned on cross-correlations between the signature sequences of all of the users.

9. The method of claim 8 wherein computing the variance of the MAI comprises computing the MAI plus noise according to the following equation:

$$\eta_{j,i}^2 = \sum_{l \neq j} \varepsilon_l r_{jl,i}^2 + \sigma^2$$

where $\eta_{j,i}^2$ is the conditional variance of the MAI, $\varepsilon_l$ is the average code bit energy, $r_{jl,i}$ is the cross-correlation between the signature sequences of users $j$ and $l$ at time $i$, and $\sigma^2$ is the time-independent variance of the channel noise.

10. The method of claim 1 comprising, between steps (b) and (c), decoding each of the individual user signals using a soft decision code-symbol Viterbi decoder and re-interleaving a code bit sequence of each user based on a user-specific interleaving pattern applied at a CDMA transmitter.

11. The method of claim 2 wherein computing the time-dependent variance of the RMAI comprises computing the time dependent variance of the RMAI according to the following equation:

$$\psi_{1,i}^2 \approx 4 \sum_{j=2}^{K} r_{1j,i}^2 \varepsilon_j P_j + \sigma^2$$

where $\psi_{1,i}$ is the time-dependent variance of the RMAI in a signal of user 1, $P_j$ is a first stage code bit error probability, $\varepsilon_j$ is an average code bit energy, $r_{1j,i}$ is a cross-correlation between a signature sequence of user 1 and a signature of user $j$ at time $i$, and $\sigma^2$ is a time-independent variance of the channel noise.

12. A demodulator for demodulating a multiuser signal using subtractive interference cancellation (IC) and single-user decoding for a code-division multiple-access (CDMA) system, the demodulator comprising:
   (a) a despreader for receiving a signal containing information for a plurality of users in a convolutionally encoded CDMA system employing spreading sequences that span a plurality of symbol periods and for despreading the received signal using a signature sequence for each user to produce individual user signals having multiple-access interference (MAI);
   (b) a subtractive interference cancellation (IC) stage for determining tentative bit estimates for each of the individual user signals and applying subtractive IC to each of the individual user signals based on the tentative bit estimates to remove the MAI from the individual user signals and thereby produce individual user signals containing residual multiple-access interference (RMAI); and (c) a decoder for decoding the individual user signals output from the subtractive IC stage using a branch metric that accounts for a time-dependence of a variance of the RMAI in the individual user signals based on a model of the RMAI.

13. The demodulator of claim 12 wherein the decoder is a Viterbi decoder and the branch metric is based on modeling the RMAI as a Gaussian random variable with time-dependent variance.

14. The demodulator of claim 12 wherein the branch metric comprises:

$$[y'_{1,i}(2)-|c_{1,i}|b_{1,i}]^2/\psi_{1,i},$$

where i is a time index, subscript 1 corresponds to a user of interest, $y'_{1,i}(2)$ is one of the individual user signals containing RMAI, $|c_{1,i}|$ is the instantaneous amplitude of the signal $y'_{1,i}(2)$, $b_{1,i}$ is a code bit, and $\psi_{1,i}$ is the time-dependent variance of the RMAI plus noise.

15. The demodulator of claim 13 wherein the decoder is adapted to compute the time-dependent variance of the RMAI by computing the variance conditioned on time-varying cross-correlations between the signature sequences.

16. The demodulator of claim 15 wherein the decoder is adapted to compute the time-dependent variance of the RMAI according to the following equation:

$$\psi_{1,i} \approx 2\sum_{j=2}^{K} r_{1j,i}^2 \varepsilon_j \left[1 - \sqrt{\frac{\varepsilon_j}{\varepsilon_j + \eta_{j,i}^2}} \left(\frac{3\eta_{j,i}^2 + 2\varepsilon_j}{2\eta_{j,i}^2 + 2\varepsilon_j}\right)\right] + \sigma^2,$$

where $\psi_{1,i}$ is the time-dependent variance of the RMAI, $r_{1j,i}$ is the cross correlation between the user of interest and user j at time i, $\varepsilon_j$ is the average code bit energy, $\eta_{j,i}^2$ is the variance of the multiple access interference seen by user j at time i after first-stage processing, and $\sigma^2$ is the time-independent variance of the channel noise.

17. The demodulator of claim 12 wherein the decoder is adapted to compute the time-dependent variance of the RMAI by computing unconditional variance of the MAI present in the individual user signals.

18. The demodulator of claim 17 wherein the decoder is adapted to compute the unconditional variance of each of the individual user signals according to the following equation:

$$\eta_{j,i}^2 = \eta_j^2 = \frac{1}{N}\sum_{l \neq j} \varepsilon_l + \sigma^2$$

where $\eta_{j,i}^2$ is the time-dependent variance of the MAI plus noise, and is approximated by the unconditional variance $\eta_j^2$, N is the spreading factor, $\varepsilon_l$ is the average code bit energy and $\sigma^2$ is the time-independent variance of the channel noise.

19. The demodulator of claim 13 wherein the decoder is adapted to compute the time-dependent variance of the RMAI by computing the variance of the MAI present in the individual user signals conditioned on the cross-correlations between the signature sequences of all of the users.

20. The demodulator of claim 19 wherein computing the variance of the MAI comprises computing the variance of the MAI plus noise according to the following equation:

$$\eta_{j,i}^2 = \sum_{l \neq j} \varepsilon_l r_{jl,i}^2 + \sigma^2$$

where $\eta_{j,i}^2$ is the variance of the MAI, $\varepsilon_l$ is the average code bit energy, $r_{jl,i}$ is the cross-correlation between the signature sequences of users j and l at time i, and $\sigma^2$ is the time-independent variance of the noise.

21. The demodulator of claim 12 comprising a soft decision code-symbol Viterbi decoder for receiving the individual user signals output from the despreader and producing individual user code bit sequences and an interleaver for re-interleaving the individual user code bit sequences based on a user-specific interleaving pattern applied at a CDMA transmitter and outputting the re-interleaved individual user code bit sequences to the subtractive IC stage.

22. The demodulator of claim 21 wherein the decoder is adapted to compute the time-dependent variance of the RMAI according to the following equation:

$$\psi_{1,i}^2 \approx 4\sum_{j=2}^{K} r_{1j,i}^2 \varepsilon_j P_j + \sigma^2$$

where $\psi_{1,i}$ is the time-dependent variance, $P_j$ is the first stage code bit error probability, $\varepsilon_l$ is the average code bit energy, $r_{1j,i}$ is a cross-correlation between a signature of a user 1 and a signature sequence of a user j at a time i, and $\sigma^2$ is the time-independent variance of the channel noise.

23. A computer program product comprising computer-executable instructions embodied in a computer-readable medium for performing steps comprising:

(a) receiving a signal containing information for a plurality of users in a convolutionally encoded CDMA system employing spreading sequences that span a plurality of symbol periods;

(b) despreading the received signal using a signature sequence for each user to produce individual user signals having multiple-access interference (MAI);

(c) determining tentative bit estimates for each of the individual user signals;

(d) applying subtractive interference cancellation (IC) to each of the individual user received signals based on the tentative bit estimates to remove the MAI from the individual user signals and thereby producing individual user signals containing residual multiple-access interference (RMAI); and (e) decoding each of the individual user signals after the subtractive IC using a Viterbi decoder with a branch metric that accounts for a time-dependence of a variance of the RMAI in the individual user signals based on a model of the RMAI.

24. The computer program product of claim 23 wherein decoding each of the individual user received signals using a Viterbi decoder with a branch metric that accounts for the time-dependence of the variance of the RMAI includes modeling the RMAI as a Gaussian random variable with time-dependent variance and computing the time-dependent variance of the RMAI.

25. The computer program product of claim 23 wherein the Viterbi decoder branch metric comprises:

$$[y'_{1,i}(2)-|c_{1,i}|b_{1,i}]^2/\psi_{1,i},$$

where i is a time index, subscript 1 corresponds to a user of interest, $y'_{1,i}(2)$ is one of the individual user signals containing RMAI, $|c_i|$ is the instantaneous amplitude of the signal $y'_{1,i}(2)$, $b_{1,i}$ is a code bit, and $\psi_{1,i}$ is the time-dependent variance of the RMAI plus noise.

26. The computer program product of claim 24 wherein computing the time-dependent variance of the RMAI comprises computing the variance conditioned on time-varying cross-correlations between the signature sequences.

27. The computer program product of claim 26 wherein computing the variance conditioned on the time-varying cross-correlations between the signature sequences comprises computing the variance according to the following equation:

$$\psi_{1,i} \approx 2\sum_{j=2}^{K} r_{1j,i}^2 \varepsilon_j \left[1 - \sqrt{\frac{\varepsilon_j}{\varepsilon_j + \eta_{j,i}^2}} \left(\frac{3\eta_{j,i}^2 + 2\varepsilon_j}{2\eta_{j,i}^2 + 2\varepsilon_j}\right)\right] + \sigma^2,$$

where $\psi_{1,i}$ is the time-dependent variance of the RMAI, $r_{1j,i}$ is the cross correlation between the user of interest and user j at time i, $\varepsilon_j$ is the average code bit energy, $\eta_{j,i}^2$ is the variance of the multiple access interference plus noise seen by user j at time i after first-stage processing, and $\sigma^2$ is the time-independent variance of the channel noise.

28. The computer program product of claim 24 wherein computing the time-dependent variance of the RMAI includes computing unconditional variance of the MAI present in the individual user signals.

29. The computer program product of claim 28 wherein computing the unconditional variance of each of the individual user received signals comprises computing the unconditional variance according to the following equation:

$$\eta_{j,i}^2 = \eta_j^2 = \frac{1}{N}\sum_{l\neq j} \varepsilon_l + \sigma^2$$

where $\eta_{j,i}^2$ is the time-dependent variance of the MAI plus noise and is approximated by the unconditional variance $\eta_j^2$, N is the spreading factor, $\varepsilon_l$ is the average code bit energy and $\sigma^2$ is the time-independent variance of the channel noise.

30. The computer program product of claim 24 wherein computing the time-dependent variance of the RMAI includes computing the variance of the MAI present in the individual user signals conditioned on cross-correlations between the signature sequences of all of the users.

31. The computer program of claim 30 wherein computing the variance of the MAI comprises computing the MAI plus noise according to the following equation:

$$\eta_{j,i}^2 = \sum_{l\neq j} \varepsilon_l r_{jl,i}^2 + \sigma^2$$

where $\sigma_{j,i}^2$ is the conditional variance of the MAI, $\varepsilon_l$ is the average code bit energy, $r_{jl,i}$ is the cross-correlation between the signature sequences of users j and l at time i, and $\sigma^2$ is the time-independent variance of the channel noise.

32. The computer program product of claim 23 comprising, between steps (b) and (c), decoding each of the individual user signals using a soft decision code-symbol Viterbi decoder and re-interleaving a code bit sequence of each user based on a user-specific interleaving pattern applied at a CDMA transmitter.

33. The computer program product of claim 24 wherein computing the time-dependent variance of the RMAI comprises computing the time dependent variance of the RMAI according to the following equation:

$$\psi_{1,i}^2 \approx 4\sum_{j=2}^{K} r_{1j,i}^2 \varepsilon_j P_j + \sigma^2$$

where $\psi_{1,i}$ is the time-dependent variance of the RMAI, $P_j$ is a first stage code bit error probability, $\varepsilon_l$ is an average code bit energy, $r_{1j,i}$ is a cross-correlation between a signature sequence of a user 1 and a signature sequence of a user j at time i, and a $\sigma^2$ is the time-independent variance of the channel noise.

34. A demodulator for demodulating a multiuser signal using single-user decoding for a code-division multiple-access (CDMA) system, the demodulator comprising:
(a) a despreader for receiving a signal containing information for a plurality of users in a convolutionally encoded CDMA system employing spreading sequences that span a plurality of symbol periods and despreading the received signal using a signature sequence for each user to produce individual user signals having multiple-access interference (MAI) with time-dependent variance; and
(b) a decoder for decoding the individual user signals output from the despreader using a branch metric that accounts for the time-dependence of the variance of the MAI in the individual user signals based on a model of the MAI.

35. The demodulator of claim 34 wherein the decoder is a Viterbi decoder and the branch metric comprises:

$$[y'_{1,i}-|c_{1,i}|b_{1,i}]^2/\eta^2_{1,i}$$

where i is a time index, $y'_{1,i}$ the input signal to the decoder for the user of interest, $|c_{1,i}|$ is the instantaneous amplitude of the signal, $b_{1,i}$ is a code bit, and $\eta^2_{1,i}$ is the time-dependent variance of the MAI plus noise.

36. The demodulator of claim 35 wherein the decoder is adapted to calculate the time dependent variance of the according to the following equation:

$$\eta_{j,i}^2 = \sum_{l\neq j} \varepsilon_l r_{jl,i}^2 + \sigma^2$$

$$\eta_{j,i}^2 = \sum_{l\neq j} \varepsilon_l r_{jl,i}^2 + \sigma^2$$

where $\eta^2_{j,i}$ is the conditional variance of the MAI, $\varepsilon_l$ is the average code bit energy, $r_{jl,i}$ is the cross-correlation between a user of interest and user j at time i, and $\sigma_2$ is the time-independent variance of the channel noise.

* * * * *